(No Model.) 3 Sheets—Sheet 1.
E. S. KEELER.
FERTILIZER DISTRIBUTER.
No. 553,246. Patented Jan. 21, 1896.
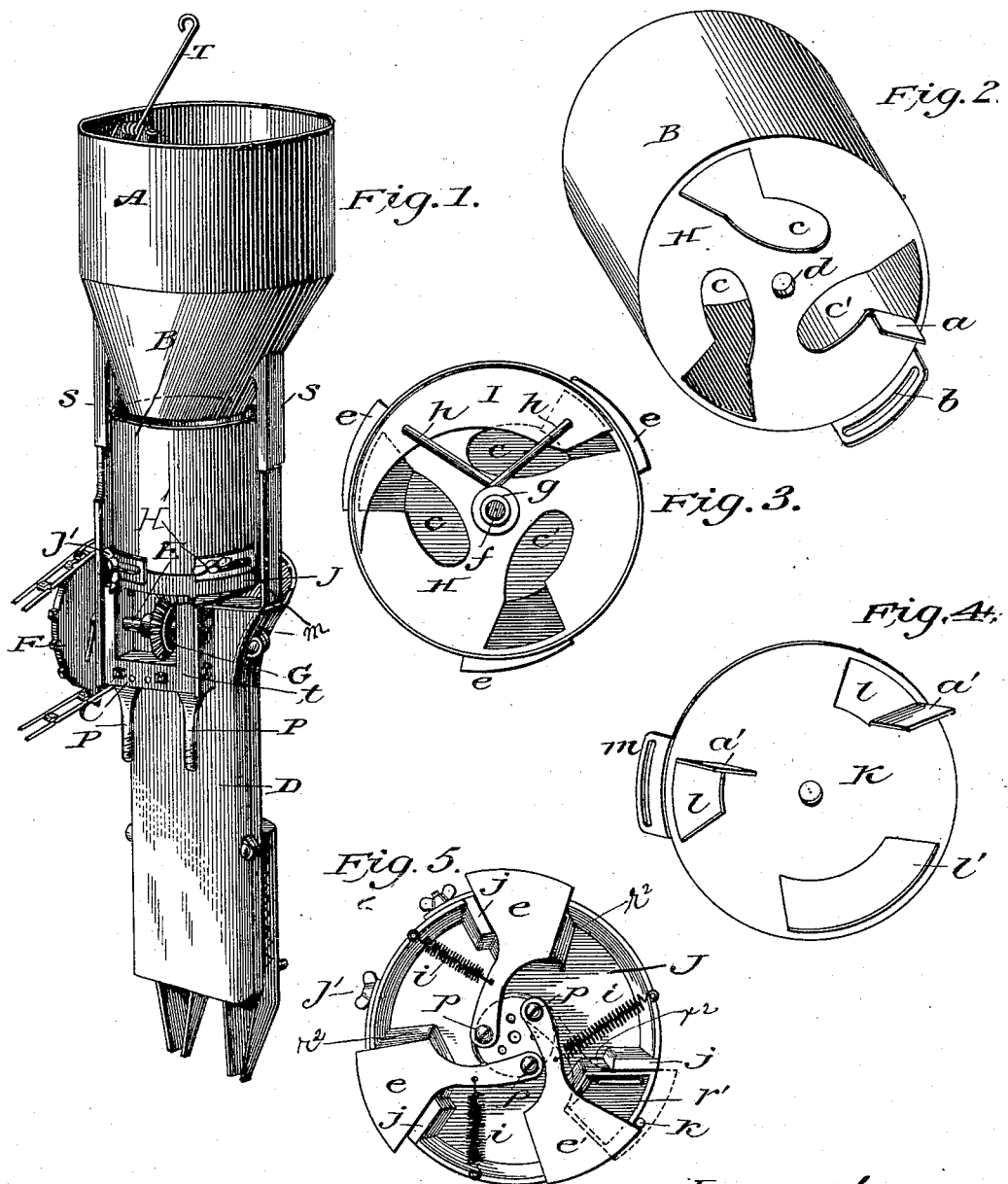
Witnesses.
R. B. Welch
J. H. Keeler
Inventor.
Elisha S. Keeler (No Model.) 3 Sheets—Sheet 2.
E. S. KEELER.
FERTILIZER DISTRIBUTER.
No. 553,246. Patented Jan. 21, 1896.
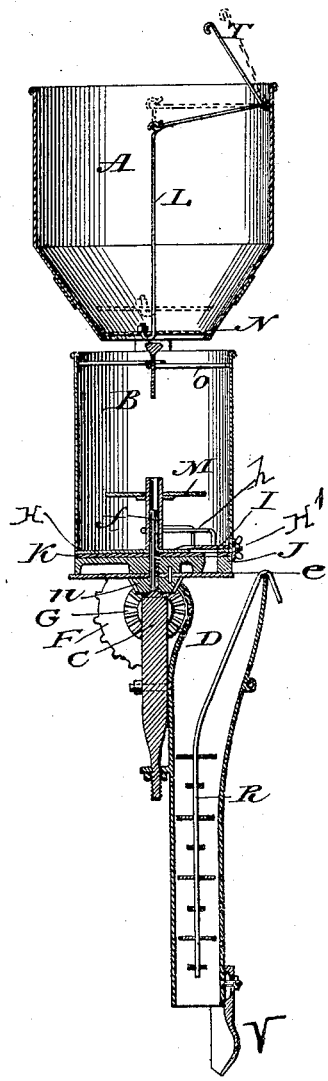
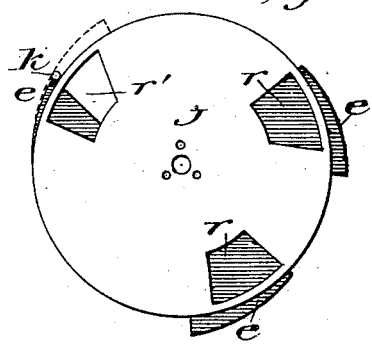
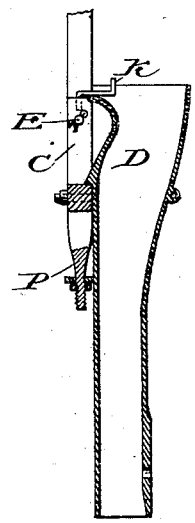
Witnesses.
Inventor.
Elisha S Keeler (No Model.)   3 Sheets—Sheet 3.

E. S. KEELER.
FERTILIZER DISTRIBUTER.

No. 553,246.   Patented Jan. 21, 1896.

WITNESSES.
R. B. Welch
J. H. Keeler

INVENTOR.
Elisha S. Keeler

UNITED STATES PATENT OFFICE.

ELISHA S. KEELER, OF TOPEKA, KANSAS.

FERTILIZER-DISTRIBUTER.

SPECIFICATION forming part of Letters Patent No. 553,246, dated January 21, 1896.

Application filed July 26, 1895. Serial No. 557,273. (No model.)

*To all whom it may concern:*

Be it known that I, ELISHA S. KEELER, a citizen of the United States, residing at Topeka, in the county of Shawnee and State of Kansas, have invented a new and useful Machine for Distributing Fertilizing Material, of which the following is a specification.

My invention relates to improvements in machines for distributing fertilizing material; and the objects of my invention are, first, to provide a hopper in which there will be no packing of fertilizing material which will interfere with its uniform escape from the hopper into a distributing-tooth; second, to provide a machine by which fertilizers may be distributed uniformly along the ground in a continuous stream or at selected intervals and in a selected quantity, as the operator may from time to time determine; third, to provide an appliance by which the operator may at his option place fertilizing material in the row with, above or under the seed, or along near both sides of the row, on or beneath the surface of the ground, and, fourth, to provide an appliance to accomplish the foregoing purposes without the friction which would arise from passing agitators through the fertilizing material. I attain these objects by the means substantially as are hereinafter described and pointed out in the claims.

My invention is illustrated in the accompanying drawings, in which—

Figure 9:
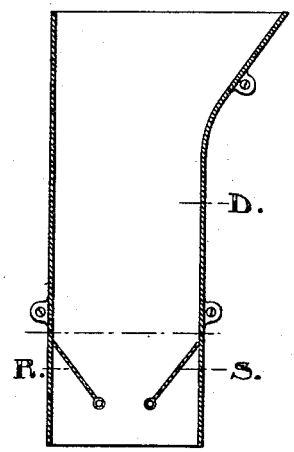
Figure 10:
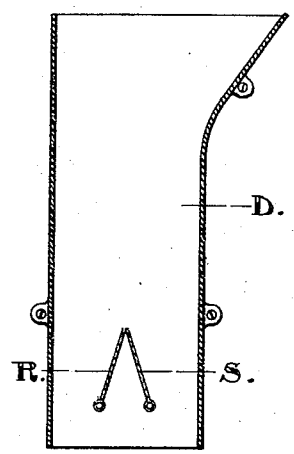
Figure 11:
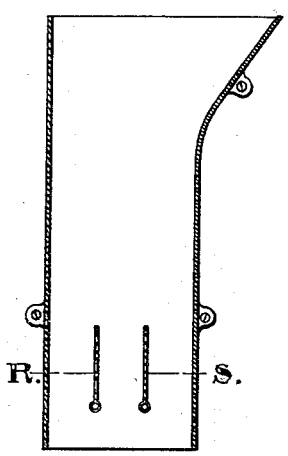
Figure 12:
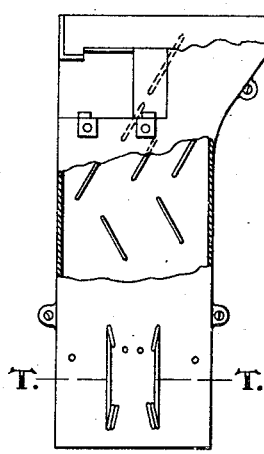
Figure 13:
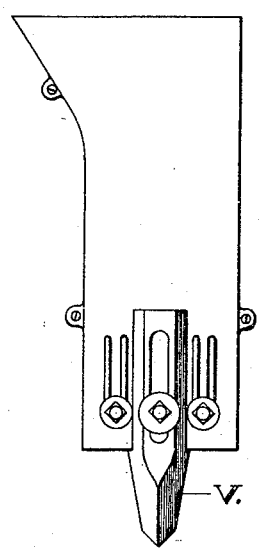
Figure 14:
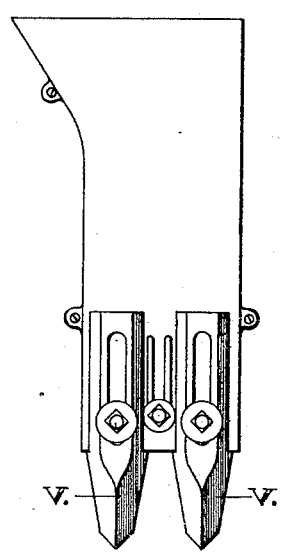

Figure 1 is a perspective view of the machine; Fig. 2, a similar detail view of the hopper. Fig. 3 is a top elevation of the bottom of the hopper with the cut-off in its proper place thereon. Fig. 4 is a perspective view of the middle perforated circular plate. Fig. 5 is a bottom elevation of the hopper with the perforated circular plates pivoted thereto. Fig. 6 is a top elevation of the lowest perforated circular plate. Fig. 7 is a central sectional view in elevation of the machine. Fig. 8 is a sectional view of the valve-opener with its immediate surroundings. Figs. 9, 10 and 11 are sectional views of the distributing-chute. Fig. 12 is a rear elevation of the distributing-chute. Figs. 13 and 14 are front elevations of the distributing-chute.

Similar letters refer to similar parts throughout the several views.

A is a reservoir in which to carry a considerable quantity of fertilizing material. B is a rotating hopper. D is a distributing-chute, and C is a frame which supports the several parts of the machine.

The reservoir A rests firmly on the arms $s$ of the frame C, and the hopper B is hung on a pivot extending upward from the arm $t$ of the frame. E is a shaft journaled to revolve in the frame C. On this shaft are fixed the sprocket-wheels F and cog-wheel G. The teeth of this cog-wheel engage the teeth of another cog-wheel $n$, Fig. 7, which is fixed to the lowest perforated plate. As this plate is fixed to the hopper B by means of a slot and a thumb-screw in the lip $b$, Fig. 2, the turning of the sprocket-wheel F causes the hopper B to revolve on the journal $f$, Figs. 3 and 7, which penetrates the hopper through the hole $d$, Fig. 2. The frame C has projections P terminating with a screw and nut, by which to attach it to a planter, walking-barrow or other vehicle having a drive-wheel with a sprocket-wheel attached.

The upper stratum of the bottom of the hopper is a plate H immovably fixed to the hopper and having perforations $c\ c\ c'$, as shown in Figs. 2 and 3. The middle stratum of the bottom of the hopper is a plate K, Fig. 4, having perforations $l\ l\ l'$. The lowest stratum of the bottom of the hopper is a plate J, Figs. 5 and 6, having perforations $r\ r\ r'$. The perforations in all these plates correspond in location, shape and size, except that perforations $c\ c\ c'$ are extended diagonally on the sides toward the center of the plate, whereby the perforations are very much enlarged in that direction, and the perforation $l'$ is about twice as long as either of perforations $l\ l$. The perforation $c'$ has a downwardly-projecting lip $a$ at its edge and plate K has two lips $a'\ a'$ at the edge of the perforations $l\ l$. Each of these lips is of the width of the perforations $r\ r\ r$, Fig. 6, and project just far enough to reach through plate J to the valves $e\ e\ e'$, Fig. 5. When plate K is adjusted upon plate H, lip $a$ will project from the lower side of that plate uniformly with lips $a'\ a'$ of plate K, and when plate J is adjusted upon plate K the three lips will reach through plate J to the plane of its lower surface.

The lip $m$, Fig. 4, is so located, and the slot therein is of such length, that the plate K can be fixed to the bottom of plate H by a thumb-screw H' in the edge of plate H in such position that the perforations $c\ c\ c'$ and $l\ l\ l'$ will so far coincide as to make three apertures through both plates or in such position that perforations $l\ l$ will be covered and but one aperture will appear, which aperture will result from the coincidence of a part of perforation $l'$ with a part of perforation $c'$.

The lip $b$, Fig. 2, is so located, and the slot therein is of such length, that plate J can be fixed to plate H (with plate K intervening) by a thumb-screw $j'$ in the edge of plate J in such various positions that the whole of perforations $r\ r\ r'$, or such part of each of them as the operator desires, shall be opposite to portions of perforations $c\ c\ c'$. There will always be one aperture through the three plates, and when plate K is adjusted so that the perforations $l\ l$ are not covered by plate H there will be three apertures through the three plates. The size of the apertures, whether there be three apertures or one, is regulated by the adjustment of plate J by means of the thumb-screw in the slot in lip $b$. These apertures serve as wells into which the fertilizing material flows from the hopper B. The lips $a\ a\ a'$ serve as movable walls of these wells, by the moving of which walls the capacity of these wells is increased or diminished. The apertures $r\ r\ r'$ have dependent walls $r^2$, which form the sides of the lower well. The valves $e\ e\ e'$ serve as bottoms for these wells. The apertures, depending wells and bottoms form in themselves pockets in plate J. Each of these valves is hung on a pivot not far from the center of plate J and projects a little way beyond the periphery of the plate. To keep it in place over the perforation $r$ it is held against the stop $j$ by the spring $i$. At each revolution of the hopper B the outer end of each of the valves $e\ e\ e'$ comes in contact with the valve-opener $k$, Figs. 5, 6, and 8, fixed to the framework C at the upper end of the distributing-tooth D. This valve-opener arrests the outer end of the valve and holds it until the perforation $r$ has passed over the valve and the fertilizing material in that well has escaped into the distributing-tooth. The valve, being pivoted at a little distance from the center of the plate J, is thus drawn inward until it escapes from the valve-opener $k$, and is drawn back by the spring $i$ or thrown back by a lever which comes in contact with the valve-opener to its position covering the perforation $r$.

In order to prevent the escape of more fertilizing material than is intended by the operator, the top of each well is closed whenever the bottom is opened. This is accomplished by means of a cut-off I, Fig. 3. This cut-off is a crescent-shaped plate which, by the arms $h$, is fixed to the pivot $f$ so that it does not revolve but remains at all times directly above the top of the distributing-chute D. The crescent-shaped plate I is wide enough to cover in succession that portion of perforations $c\ c\ c'$ which coincides with the perforations through plates K and J, but is not wide enough to entirely cover said perforations $c\ c\ c'$. It is fixed in such position that its convex edge coincides with the periphery of plate H, and its concave edge does not extend far enough toward the center of the plate to catch or squeeze lumps of material against the edge of the plate.

The journal $f$ is extended some distance up into the hopper B, and on the upper end of said journal is hung, pivotally, a flat circular horizontal plate, (a sectional view of which, marked M, is shown in Fig. 7,) the diameter of which is considerably less than the diameter of the hopper. The chief purpose of this plate is to sustain a portion of the weight of the fertilizing material when the hopper is nearly full, and thereby to assist in preventing it from packing in the bottom of the hopper. The arms $h$ radiate from the journal $f$ at some distance above the bottom of the hopper, and assist the circular plate M in keeping the fertilizing material in the lower part of the hopper in a loose and light condition.

The reservoir A may be many times larger than the hopper B. The bottom N of the reservoir is fixed to the lower end of an arm L, pivoted to a lever T, which is connected by a bell-crank joint to the side of the reservoir, and from the upper end of which lever a chain may extend back to some point within easy reach of the operator. By pulling upon this lever the bottom N of the reservoir is raised, as shown in dotted lines in Fig. 7, so that material escapes into the hopper, and when the wire or chain is relaxed the bottom at once settles back into its place.

R S, in Figs. 9, 10, and 11, are valves, each of which is pivoted in the distributing-chute fixed to the lower edge of the valve and projecting from each of the two lower corners of the valve into the contiguous wall of said chute. These valves are just wide enough to extend from the front to the rear wall of the chute, and are just long enough so that when their upper edges are turned outward, so as to rest against the lateral walls of the chute, as shown in Fig. 9, or are turned inward, so as to rest against each other, as shown in Fig. 10, their upper surfaces will be inclined planes, as shown in said Figs. 9 and 10. The pivots upon which said valves R S are hung project through and beyond the rear wall of the chute, and the projecting ends are bent as shown in Fig. 12, so as to form cranks T T by which the valves are turned. The ends of these cranks are bent inward, so as to rest in indentations in the outside of the rear wall of the chute. The cranks are made elastic enough to allow the ends to be raised from one indentation and moved to another. These indentations serve to hold the cranks in the desired positions.

V V V in Figs. 13 and 14 are furrow-openers screwed to the outside of the front wall of the chute. To further promote the equal flow and distribution of the fertilizing material, I have teeth projecting from the inside of the walls of the upper portion of the chute.

To operate said machine the operator first attaches it to a planter, walking-barrow or some other vehicle having a driving-wheel which rotates a sprocket-wheel. This attachment is made by means of the projections P and the screws and nuts thereon or by some similar device. It must be so attached to the vehicle that a sprocket-chain will connect the sprocket-wheel F with a sprocket-wheel on the vehicle. He then fills the reservoir A with fertilizing material, and by pulling the wire T lets enough material into the hopper to fill it nearly full. As the material will not flow with any regularity he raises and lowers the bottom N by means of the wire until he has shaken out of the reservoir as much material as he desires to fall into the hopper at one time. As the reservoir is narrowed at the bottom, the inside of the hopper is all the time in view of the operator, and he can see when it is necessary to let more material out of the reservoir. When the operator desires to distribute the fertilizing material in a continuous row or stream, he fixes plate K in such position that perforations $l\,l$ coincide with perforations $c\,c$. When he desires to distribute the material in hills a considerable distance apart, he fixes plate K in such position that no part of perforations $c\,c$ coincide with any part of perforations $l\,l$, and there remains but one aperture through the three plates H, K and J.

When the operator desires to place the fertilizing material in the hill or row with, under, or above the seed, he turns the valves R S so that their upper edges rest against the lateral walls of the distributing-chute, as shown in Fig. 9, and attaches a furrow-opener V to the middle of the front side of the distributing-tooth, as shown in Fig. 13. When the operator desires to place the fertilizing material on each side, only, of the row, he turns the valves so that their upper edges rest against each other, as shown in Fig. 10, and attaches two furrow-openers in the positions shown in Fig. 14. When he desires to place the fertilizing material on the surface, only, of the ground, he uses the distributing-chute without furrow-openers, as shown in Fig. 12. In either case he also fixes the plate J to the hopper B in such position as to make each discharge of material into the distributing-chute to be such quantity as he prefers. This is done by means of the thumb-screw H' in the slot in lip $b$, as hereinbefore indicated. Further variations in the intervals between discharges of material may be provided for by changing the gear of the sprocket-wheels. The vehicle bearing the machine is propelled along the ground in the usual manner of propelling a wheeled planter or seeder.

This machine may be attached to a vehicle that at the same time operates a planter or seeder, so that the operator will both seed and fertilize the ground at one operation.

What I claim, and desire to secure by Letters Patent, is—

1. In a fertilizer distributer, in combination with a suitable detachable supporting frame, screws and nuts for attaching the frame to and detaching it from a vehicle, a rotating hopper pivoted on said frame, a bevel gear on the bottom of said hopper, a bevel gear on the frame engaging the hopper gear, a sprocket wheel on said frame, and a connecting sprocket chain, whereby the hopper is given its rotary movement, substantially as described.

2. In combination with a hopper, a reservoir for receiving and conducting the material to the hopper, said reservoir of less diameter at its lower end than the hopper and provided with a bottom consisting of a loosely hung plate, and a lever for raising and lowering said plate, whereby when said plate is raised the material is permitted to fall around it and through the hopper, substantially as described.

3. The hopper provided with a central supporting rod, a plate pivoted thereon, and rigid arms extending outward from said rod and then downward to a cut off plate on the side of the hopper, whereby the material in the lower part of the hopper is kept loose and light, substantially as described.

4. In a feeding distributer, a hopper having a bottom plate, said plate provided with walled feeding apertures constituting pockets and a separate movable bottom for each pocket, in combination with two upper plates each provided with feeding apertures and depending lips extending to the said bottom plate, whereby feeding wells are formed in connection with said bottom pocket, substantially as described.

5. In a feeding distributer, a rotating hopper provided with three perforated bottom plates, the lowest of said plates provided with pockets, in combination with pivoted horizontally sliding spring controlled cut offs, one cut off for each of said pockets, and a stationary lug or opener against which said cut offs strike as the hopper rotates, whereby the control of the material in the said pockets and its escape are automatically effected, substantially as described.

6. A rotary hopper provided with perforated plates, the perforations of which are adapted to register, the perforations of the upper plate being larger and extending toward the center of the hopper beyond the perforations of the lower plates, in combination with a stationary crescent shaped cut-off plate within and attached to the hopper adapted to extend over the perforations of the lower plates but only partly over the perforations of the upper plate, when the hopper is rotated, substantially as and for the purpose described.

7. In a fertilizer distributer, a hopper provided with a plate having perforations, $c$, the said perforations extending diagonally from the sides of said hopper to near its center, each perforation having its inner portion formed with straight sides, and its outer portion formed with curved sides and bent at an obtuse angle to said inner portions, substantially as and for the purpose described.

8. In a fertilizer distributer, the combination with a rotary hopper provided with a plate fixed to the hopper, said plate having feed apertures extending from its sides diagonally toward its center, a second lower plate connected to and adjustable on the first plate, and means for such connection and adjustment, the said second plate having feed apertures of unequal length extending along its sides, whereby the said lower plate may be adjusted on the upper plate so that but one aperture will be open through the lower plate, substantially as described.

9. In a rotating hopper provided with adjustable perforated plates, in combination with means of adjustment, the perforations in said plates having on their edges downwardly projecting lips which extend into the perforations in the plate beneath whereby when an upper plate is adjusted on a plate beneath it to increase or decrease the size of said lower perforation, the said lips will form a wall for said lower perforation, substantially as and for the purpose described.

10. In combination with a hopper of a fertilizer distributer, a bottom adjustable plate J, provided with wells $j$, perforations, $r, r, r'$, centrally pivoted spring sliding valves $e$, and a slotted plate and thumb screw for adjusting the position of said plate on the hopper, substantially as described.

11. A fertilizer distributer having a discharge chute, said chute provided with wings R, S, in combination with rotary rods to which the lower ends of said wings are attached, said rods extending through the chute and on the outside of the chute bent to form a crank handle for turning the same, the chute being provided with indentations to engage and hold the handle and rod, when the said wings are set, substantially as described.

Signed at Topeka, in the county of Shawnee and State of Kansas.

ELISHA S. KEELER.

Witnesses:
HENRY KEELER,
R. B. WELCH.